UNITED STATES PATENT OFFICE.

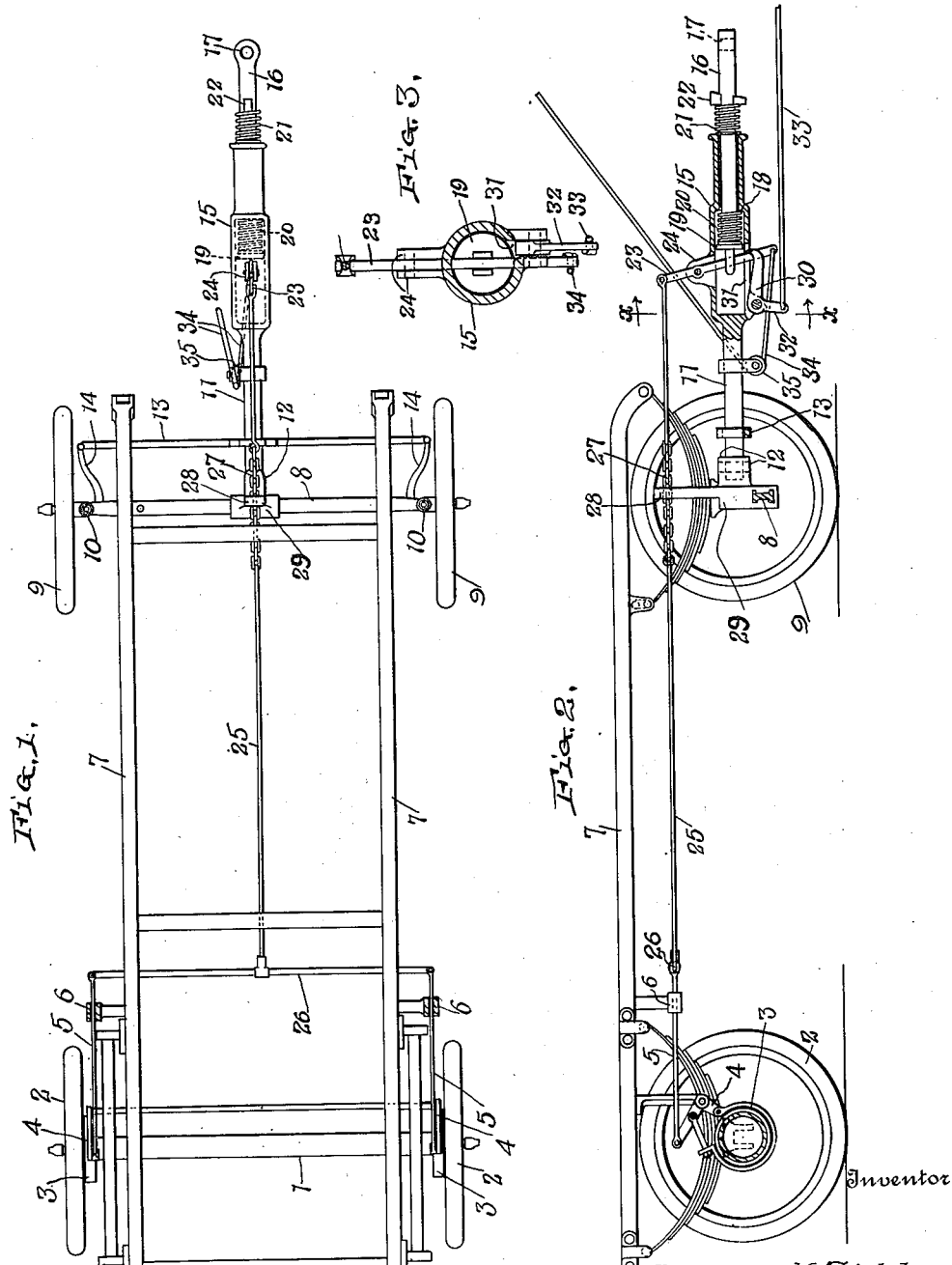

BERNARD H. ZIEHLER, OF DAYTON, OHIO.

TRAILER.

1,185,751.
Specification of Letters Patent.
Patented June 6, 1916.

Application filed December 13, 1915. Serial No. 66,454.

*To all whom it may concern:*

Be it known that I, BERNARD H. ZIEHLER, a citizen of the United States, residing at Dayton, in the county of Montgomery and State of Ohio, have invented certain new and useful Improvements in Trailers, of which the following is a specification, reference being had therein to the accompanying drawing.

This invention relates to trailers such as are commonly coupled to and drawn by motor driven or horse drawn vehicles, and more particularly to means for actuating the brakes of such a trailer.

It is customary with many farmers, small dealers and others, to use light weight passenger automobiles for hauling purposes and it is frequently desirable to use trailers in connection with such automobiles. Because of the light weight of the machines, the brake mechanism thereof is insufficient to adequately control both the machine and the trailer, when loaded. The present invention is designed primarily for use with trailers of this character, but its use is not limited to trailers of any particular type or to trailers used in connection with any particular kind of vehicle.

The object of the invention is to provide an automatic brake actuating mechanism of a strong but simple character, which will be positive in its operation and which will have ample power to set the brakes; and which will be of such a construction that it can be manufactured at a comparatively low cost.

It is also an object of the invention to provide a brake operating mechanism of such a character that its efficiency will not be affected by the turning movement of the trailer and the vehicle which draws the same; and which will permit of the use of steering devices which will cause the trailer to follow in the tracks of the preceding vehicle when a turn is made.

A further object of the invention is to provide a mechanism of this character which can be locked against operation to permit the trailer being backed, or moved rearwardly, by the vehicle with which it is connected; and it is also an object of the invention to provide means for actuating the brakes from the vehicle with which the trailer is connected, independently of the automatic actuating devices.

In the accompanying drawings, Figure 1 is a plan view of the running gear of a trailer embodying my invention. Fig. 2 is a side elevation of the same, partly in section; and Fig. 3 is a transverse sectional view taken on the line $x$—$x$, Fig. 2, looking in the direction of the arrows.

In these drawings I have illustrated one embodiment of my invention and have shown the same as applied to a light weight trailer comprising a rear axle 1, having mounted thereon wheels 2, which are provided with braking devices of a well known type. Each of these braking devices comprises a band brake 3, and a lever 4 which is connected with a rod 5, slidably mounted in a suitable guideway 6 and adapted to impart operative movement to the lever 4 when moved in a forward direction. It will be understood, however, that the braking devices may be of any suitable character, and that those here shown have been chosen for the purpose of illustration only. The rear axle is connected by the usual frame 7 with a front axle 8, which in the construction here shown is fixed against turning movement, and the steering wheels 9 are mounted on knuckles 10 carried by this fixed front axle.

A suitable device is provided for connecting the trailer with the preceding vehicle, which may be either a motor driven vehicle, a horse drawn vehicle, or another trailer. This connecting device may take various forms but I prefer that it should be of such a character as to permit the trailer to have movement toward and away from the preceding vehicle, which movement can be utilized to control the braking devices on the trailer. As here shown, the connecting device is in the form of a tongue 11, which is pivotally connected to the front axle by mounting the rear end thereof between pivot lugs 12 rigidly secured to the axle, and which is operatively connected with the steering wheels by means of a transverse bar 13 connected thereto at a point between its ends and connected at its ends with the arms 14, which in turn are connected with the knuckles of the steering wheels. Coöperating with the tongue 11 is a member adapted to be connected with the preceding vehicle and so arranged that the tongue has longitudinal movement relatively thereto. In that form of device here shown, this coöperating member constitutes a part of the connecting device, and to this end the tongue 11 is formed in two parts, one of which is capable of longitudinal movement relative to the other. In this construction the two parts of the tongue are telescoped, the rear part having a hollow portion 15 in which is mounted the forward or slidable portion 16, but the connection may be formed in any suitable manner. The forward portion 16 is provided in its front end with means, such as the eye 17, for connecting it with the vehicle by means of which the trailer is to be drawn. The hollow portion, or sleeve 15, of the rear part of the tongue has an enlarged portion forming a shoulder 18, which coöperates with a shoulder, or collar, 19, carried by the inner end of the slidable member 16 to limit the outward movement of the slidable member. Preferably, a spring 20 is coiled about the slidable member 16 between the shoulders 18 and 19 to cushion its movement. If desired, a similar spring 21 may be provided between the forward end of the hollow portion of the tongue and a stop 22, which is rigidly secured to the slidable member thereof. Thus the sliding movement of the member 16 is cushioned in both directions.

The relative movements of the two parts of the connecting device are utilized to operate the braking devices and I prefer to mount the controlling, or operating, mechanism for the braking devices on the connecting device, as, by so doing, I avoid interference with the steering of the trailer, and prevent the operation of the brakes from being in any way affected by the load on the trailer. The particular operating device here illustrated comprises a lever 23 which is mounted on the rear part of the connecting device with one end arranged in the path of the slidable member 16. The hollow portion 15 of the connecting member is shown as provided with lugs 24 between which the lever 23 is pivotally mounted, and the hollow portion 15 is slotted to permit the lever to pass through the same immediately in the rear of the slidable member 16, as clearly shown in Fig. 2. This lever is directly connected with the slidable member 16 of the connecting device 11, this connection being preferably formed by a loose contact between the end of the slidable member and the lever and may be readily accomplished by passing the end of the lever through the bifurcated end of the slidable member. This form of connection permits the lever to be moved independently of the slidable member 16, but forms a strong, positive connection between the parts whereby operative movement will be imparted to the lever by the rearward sliding movement of the member 16. The upper end of the lever, which projects above the connecting device 11, is operatively connected with the braking devices. Inasmuch as the lever 23 is so mounted and so connected with the slidable member 16 as to exert a forward pull upon the actuating member for the braking devices, I am enabled to use for the connection a very light member and to make this member flexible, which could not be done where the brakes are operated by a rearward thrust, as under such circumstances a very strong connecting member would be required in order that sufficient power might be applied to the brakes without danger of the connecting member buckling or breaking. As here shown, the connecting member comprises a rod 25 which is connected at its rear end with a cross-bar 26, which in turn is connected at its ends with the respective rods 5, which actuate the braking devices. It will be obvious, therefore, that when the vehicle and trailer are in motion on a level surface and the brakes are applied to the vehicle, the momentum of the trailer will move it toward the vehicle, thus causing the two parts of the connecting device 11 to have relative movement. This movement is transmitted through the operating mechanism, 23 and 25, to the braking devices and a powerful braking action is exerted upon the trailer. Because of the direct connection between the lever 23 and the slidable member 26, and the arrangement of these parts to exert a forward pull upon the actuating rod 25, the operation of the mechanism is positive, there being no liability of failure due to the buckling or breaking of the connecting parts. Further, this construction is such that the mechanism can be produced at a very low cost.

Inasmuch as the connecting device 11 serves as a steering device as well as a propelling device for the trailer, it is necessary that it should have pivotal movement at or near the front axle. Consequently, it is desirable that some means should be provided to prevent this turning movement from affecting the operativeness of the brake actuating devices, which would otherwise result from the different centers about which the connecting device 11 and the connecting rod 25 would be moved. I have therefore provided a flexible connecting member through which power is transmitted to the braking devices. In the present form of the device I have utilized a section of flexible material 27, such as chain, to pivotally connect two parts of the rod 25. This flexible portion of the connecting member extends through a guide 28 which is arranged close to the pivotal connection between the connecting device 11 and the axle, so that the forward portion of the connecting member 27 will move about an axis approximately in line with the axis of the connecting device 11, and the rearward portion of the connecting member will have no pivotal movement. In the preferred form of mechanism, the guide 28 is in the form of a projection, or arm, rigidly secured to the axle 8 and preferably forming a part of a casting 29 which also includes the pivot lugs 12, to which the tongue or connecting device 11 is secured.

By the use of a flexible device to transmit the power to the braking devices, I am able to mount the operating mechanism in advance of the front axle and so arrange the mechanism as a whole that it will not interfere with any form of steering device which it may be desirable to use and will not be subjected to friction or otherwise affected by the load on the trailer.

It is sometimes desirable, or necessary, to back the trailer along with the vehicle with which it is connected. Unless means are provided to prevent the operation of the braking devices the backing of the vehicle will set the brakes on the trailer and prevent its movement. Therefore, to permit this rearward movement, I have provided means for locking the braking devices against movement. This may be accomplished in different ways, but that here shown is very simple and highly efficient. It consists in mounting a detent 30 upon the lower wall of the hollow portion 15 of the connecting device, and providing the latter with a slot 31 through which the end of this detent may be moved into the path of the slidable member 16. The detent is normally held in an inoperative position by gravity, and is provided with an arm 32, which in turn has connected thereto an actuating device, such as a cord 33, by means of which the detent can be actuated from the vehicle. When thus equipped the driver of the vehicle has only to manipulate the actuating device 33 to move the detent into the path of the slidable member 16 and thus effectually lock this member against movement and thereby lock the brake mechanism against operation.

It is also sometimes desirable that the brakes on the trailer should be operated independently of the automatic actuating devices, as, for instance, when it is necessary to bring the trailer and the vehicle which is drawing the same to a stop on an up-grade. A heavily loaded trailer might readily pull the vehicle backward down hill if the power were cut off. To prevent this I have provided means whereby the driver may set the brakes on the trailer independently of the slidable member 16. As has been stated the connection between the lever 23 and the slidable member 16 is such that the former has movement independently of the latter. To enable the latter to be actuated by the driver, I have connected therewith a suitable actuating device, which, in the present instance, is in the form of a cable 34 secured to the lower end of the lever 23, extending about a guide 35, thence forward to the vehicle with which the trailer is connected.

The operation of the mechanism will be readily understood from the foregoing description of the several parts thereof, and it will be apparent that the device is of a simple inexpensive construction, but has ample strength and power to control the brakes of the trailer, and further, that the mechanism is of such a character that the operation of the brakes is positive and there is little or no liability of their failing to operate; that it permits the use of steering devices which will cause the trailer to "track" in a satisfactory manner; and will not be affected by load conditions or by the turning movements of the trailer. Further, it will be apparent that I have provided means whereby the actuating devices for the brakes may be so controlled as to prevent the setting of the brakes, or to set the brakes independently of the automatic actuating devices therefor.

While I have shown and described one embodiment of my invention, I wish it to be understood that I do not desire to be limited to the details of construction so shown and described as various modifications will occur to a person skilled in the art.

Having now fully described my invention what I claim as new and wish to secure by Letters Patent is:—

1. In a trailer, a braking device to control the movement of said trailer, a device to connect said trailer to a preceding vehicle, said connecting device comprising a slidable member, means for operatively connecting said slidable member with said braking device, said connection being so arranged that the rearward movement of said slidable member will cause the operation of said braking device, a device to prevent the operation of said braking device, and means operable from the preceding vehicle to control the last-mentioned device.

2. In a trailer, a braking device to control the movement of said trailer, a device to connect said trailer to a preceding vehicle, said connecting device comprising a slidable member, means for operatively connecting said slidable member with said braking device, said connection being so arranged that the rearward movement of said slidable member will cause the operation of said braking device, and means operable while said trailer and said vehicle are in motion to lock said slidable member against sliding movement.

3. In a trailer, a braking device to control the movement of said trailer, a device to connect said trailer with a preceding vehicle, said connecting device comprising a slidable member, means for operatively connecting said slidable member with said braking device, said connection being so arranged that the rearward movement of said slidable member will cause the operation of said braking device, a detent held normally out of the path of said slidable member, and an actuating device for said detent arranged for operation from said preceding vehicle.

4. In a trailer, a braking device to control the movement of said trailer, a device to connect said trailer to a preceding vehicle, said connecting device comprising a slidable member, means for operatively connecting said slidable member with said braking device, said connection being so arranged that the rearward movement of said slidable member will cause the operation of said braking device, and an actuating member operatively connected with said connecting means to operate said braking device independently of said slidable member.

5. In a trailer, a braking device to control the movement of said trailer, a device to connect said trailer to a preceding vehicle, said connecting device comprising a slidable member, a lever having one end connected with said slidable member, means for connecting said lever with said braking device, said lever being so arranged with respect to said slidable member and said connecting member that the rearward movement of said actuating member will cause a forward pull to be exerted on said connecting member, and an actuating device connected with said lever and leading to said preceding vehicle to enable said braking device to be actuated independently of said slidable member.

6. In a trailer, a braking device to control the movement thereof, a tongue to connect the trailer with a preceding vehicle, said tongue comprising two parts arranged in longitudinal alinement and one of which is longitudinally movable relatively to the other, a lever mounted on said tongue with one end operatively connected with said longitudinally movable part, and an operable connection between said lever and said braking device.

7. In a trailer, a braking device to control the movement thereof, a tongue to connect the trailer with a preceding vehicle, said connecting device comprising two telescoping parts one of which is connected with said trailer and the other of which is connected with said preceding vehicle, a lever mounted on and extending through the outer part of said tongue and arranged in the path of the other part of said tongue, and an operative connection between said lever and said braking device.

8. In a trailer, a braking device to control the movement thereof, a tongue to connect the trailer with a preceding vehicle, said tongue comprising two parts arranged in longitudinal alinement and slidably connected one to the other, a lever pivotally mounted on one part of said tongue and arranged to be actuated by the relative movement of the two parts thereof, an operative connection between said lever and said braking device, and cushioning devices to cushion the relative movement of the two parts of said tongue.

9. In a trailer, a braking device to control the movement thereof, a tongue to connect the trailer with a preceding vehicle, said tongue comprising two parts one of which is connected with said trailer and the other of which is slidably mounted on the first part and is adapted to be connected with said vehicle, a lever pivotally mounted on the first-mentioned part of said tongue and having its end extending into the path of the slidable member thereof, and a connection between the other end of said lever and said braking device.

10. In a trailer, a braking device to control the movement thereof, a tongue to connect the trailer with a preceding vehicle, said tongue comprising two parts one of which is connected with said trailer and the other of which is slidably mounted on the first part and is adapted to be connected with said vehicle, a lever pivotally mounted on the first-mentioned part of said tongue and having its end extending into the path of the slidable part thereof, a connection between the other end of said lever and said braking device, and means to lock said slidable part of said tongue against sliding movement.

11. In a trailer, a braking device to control the movement thereof, a tongue to connect the trailer with a preceding vehicle, said tongue comprising two parts one of which is connected with said trailer and the other of which is slidably mounted on the first part and is adapted to be connected with said vehicle, a lever pivotally mounted on the first-mentioned part of said tongue and having its end extending into the path of the slidable part thereof, a connection between the other end of said lever and said braking device, a detent mounted on the first-mentioned part of said tongue and held normally in an inoperative position, and an actuating device for moving said detent into the path of the slidable part of said tongue.

12. In a trailer, a braking device to control the movement thereof, a tongue to connect the trailer with a preceding vehicle, said tongue comprising two parts one of which is connected with said trailer and the other of which is slidably mounted on the first part and is adapted to be connected with said vehicle, a lever pivotally mounted on the first-mentioned part of said tongue and having its end extending into the path of the slidable part thereof, a connection between the other end of said lever and said braking device, and an actuating device connected with said lever and extending to said preceding vehicle to enable said lever to be operated independently of said slidable part of the tongue.

13. In a trailer, a braking device to control the movement thereof, a tongue to connect said trailer with a preceding vehicle, said connecting device comprising a part pivotally connected with said trailer on a vertical axis, another part slidably connected with the first-mentioned part, a guide mounted on said trailer near the axis of said first-mentioned part of said tongue, an operating mechanism comprising a member connected with said braking device and having a flexible portion extending through said guideway, and means for operatively connecting the last-mentioned member with the slidable member of said tongue.

14. A trailer comprising rear wheels and braking devices therefor, a rigid front axle, steering wheels pivotally mounted at the ends of said rigid axle, a tongue pivotally mounted on said front axle for movement about a vertical axis, operatively connected with said steering wheel and comprising a slidable member, a guide mounted adjacent to the axis of said tongue, an operating mechanism comprising a member connected with said braking devices and having a flexible portion extending through said guideway, and an operative connection between the last-mentioned member and the slidable part of said tongue.

15. A trailer comprising rear wheels and braking devices therefor, a rigid front axle, steering wheels pivotally mounted at the ends of said rigid axle, a tongue pivotally mounted on said front axle for movement about a vertical axis, operatively connected with said steering wheel and comprising a slidable member, a guide mounted adjacent to the axis of said tongue, an operating mechanism comprising a member connected with said braking devices and having a flexible portion extending through said guideway, a lever pivotally mounted on said tongue, having one end operatively connected with the slidable part of said tongue and having its other end connected with said actuating member.

16. In a trailer having steering wheels at the front end thereof, a braking device to control the movement of said trailer, controlling mechanism for said braking device arranged in advance of said steering wheels, pivoted means to actuate said steering wheels, controlling mechanism with said brake, a flexible device to connect said mechanism, and a guide for said flexible device arranged near the axis of said actuating device for said steering wheels.

17. In a trailer, a braking device to control the movement thereof, a tongue to connect the trailer with a preceding vehicle, said tongue comprising two parts arranged in longitudinal alinement and one of which is longitudinally movable relatively to the other, an actuating device mounted on said tongue, operatively connected with the longitudinally movable part thereof and having operative connections with said braking device, and cushioning devices to cushion the movements of the movable part of said tongue in either direction.

18. In a trailer, a braking device to control the movement thereof, a tongue to connect the trailer with a preceding vehicle, said tongue comprising two parts one of which is longitudinally movable relatively to the other, an actuating device mounted on said tongue, operatively connected with the longitudinally movable part thereof and having operative connection with said braking device, and means to operate said actuating device independently of the relative movement of the two parts of said tongue.

In testimony whereof, I affix my signature hereto.

BERNARD H. ZIEHLER.